Figure 1:
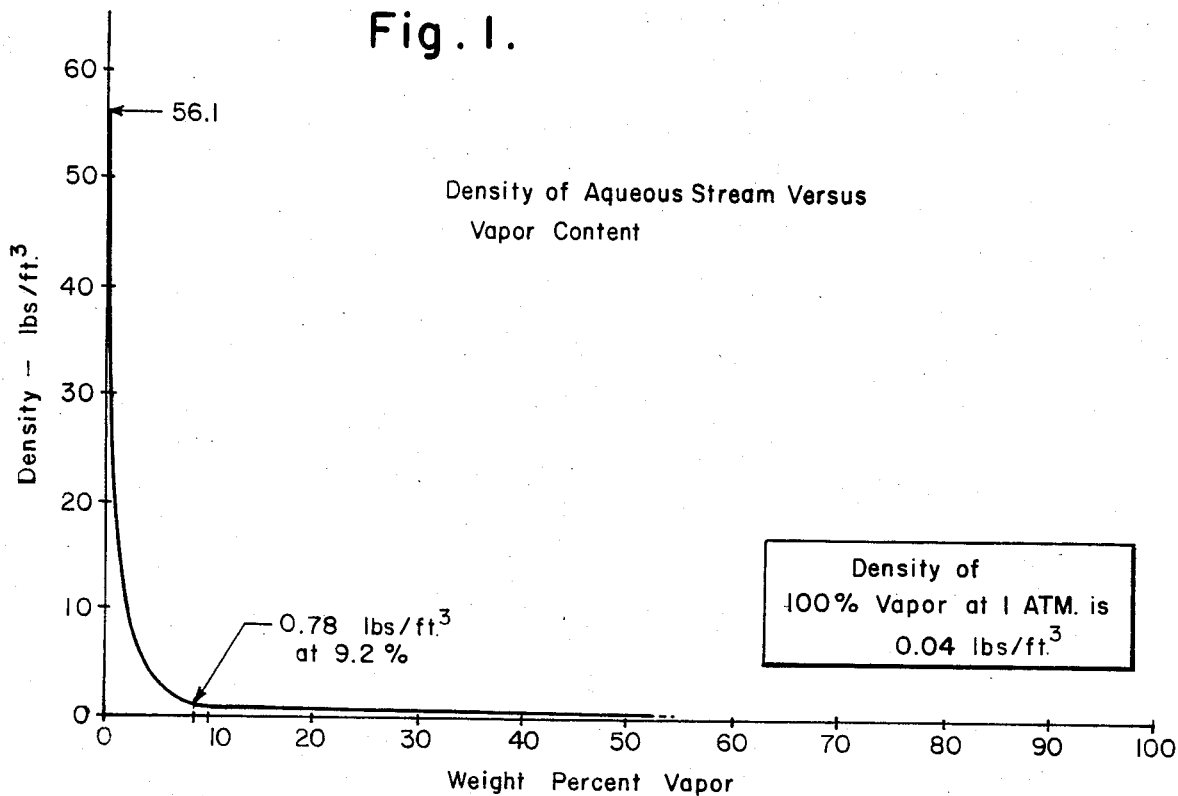

United States Patent [19]

Venetta

[11] Patent Number: 4,565,583
[45] Date of Patent: Jan. 21, 1986

[54] PROCESS FOR REMOVING OIL FROM METAL CHIPS

[75] Inventor: Henry J. Venetta, Trumull County, Ohio

[73] Assignee: Inductotherm Corporation, Rancocas, N.J.

[21] Appl. No.: 603,503

[22] Filed: Apr. 24, 1984

[51] Int. Cl.⁴ ............................................. B08B 3/04
[52] U.S. Cl. ................................. 134/12; 29/403.3; 134/19; 134/25.1; 134/25.5; 134/40
[58] Field of Search ................... 29/403.3; 134/25.1, 134/25.4, 25.5, 12, 40, 10, 11, 19

[56] References Cited

U.S. PATENT DOCUMENTS

| | | | |
|---|---|---|---|
| 1,580,723 | 4/1926 | Hapgood | 134/10 |
| 1,743,466 | 1/1930 | Maag et al. | 134/10 |
| 2,686,192 | 8/1954 | Bonotto | 134/25.1 |
| 2,852,418 | 9/1958 | MacDonald | 134/2 |
| 2,925,821 | 2/1960 | MacDonald | 134/65 |
| 3,017,342 | 1/1962 | Bulat et al. | 134/25.1 |
| 3,163,929 | 1/1965 | Goodstein | 29/403 |
| 3,734,776 | 5/1973 | Keogh, Jr. | 134/10 |
| 3,930,879 | 1/1976 | Erickson et al. | 134/25.4 |
| 4,097,306 | 6/1978 | Carman | 134/10 |
| 4,136,217 | 1/1979 | Henley | 427/327 |
| 4,304,742 | 12/1981 | Stoter | 134/25.1 |

FOREIGN PATENT DOCUMENTS 486089  1/1976  U.S.S.R. .................... 134/25.1

OTHER PUBLICATIONS

Amorante, "Analyzing Flashing Flow with a Programable Calculator", *Plant Engineering*, Apr. 19, 1979, pp. 269–273.

Primary Examiner—Peter Hruskoci
Attorney, Agent, or Firm—Seidel, Gonda, Goldhammer & Abbott

[57] ABSTRACT

A process is described for removing oil from oily metal chips. Hot pressurized liquid water is continuously passed over a bed of the chips contained in a pressurized vessel. In one embodiment, the water is expanded over the chips to partially vaporize the liquid water and greatly reduce the density of the flowing stream. The density reduction increases the velocity of the stream flowing over the chips and increases the frictional cleaning effect of said stream. A water-oil mixture is continuously removed from the vessel.

37 Claims, 3 Drawing Figures

PROCESS FOR REMOVING OIL FROM METAL CHIPS

This invention relates to a process for removing oil from metal parts, chips, turnings and borings (hereinafter referred to as chips) created by cutting tools using cutting oil for cooling and lubrication.

The chips to be treated are small and have a film of oil accounting for as much as 8 or 10 weight percent of the chips. The present process avoids burning of the oil on the chips and instead permits reclaiming of the oil. It provides cleaned chips having an oil content of generally less than 2 weight percent and preferably less than 1 or even 0.5 weight percent suitable to be charged to metallurgical reclaiming processes.

In accordance with the present invention a charge of oily chips is placed into a pressure vessel to which a stream of hot water under a superatmospheric pressure is continuously added. The stream of water under superatmospheric pressure passes continuously over the chips to remove oil from the chips. The oil removed from the chips enters into an oil-water admixture and in that condition is continuously carried from the system. Some or all of the water remains in the liquid state enabling it to serve not only as a cleaning medium, but also as a vehicle to carry the oil from the system. The oil can form a mixture with the liquid water or it can form an emulsion, depending upon the stability of the mixture or the size of the oil droplets. The term oil-water mixture as used herein covers both a mixture and an emulsion. Detergents or other chemical cleaning agents can be added to the water, but are not required in accordance with this invention.

In order to form an oil-water mixture, the oil first must be removed from the surface of the chips. In accordance with this invention, this removal is accomplished by a combination of effects, including lowering of oil viscosity by exchange of heat from the hot water to the oil followed by a frictional cleansing or scrubbing effect. The scrubbing effect is in part dependent upon the velocity of water under superatmospheric pressure as it flows over the chips. The velocity of flow provides the frictional cleansing effect. A high velocity increases the frictional or abrasive motion necessary for scrubbing the lowered viscosity oil from the chips.

One way to increase the velocity of flow of a given mass of water is to convert the water to dry or superheated steam at a boiler and inject the mass as high velocity jets of steam over the chips. However, this involves a high energy input to the process in the form of heat of vaporization and deprives the oil of liquid water in which to form a mixture for removal from the system. Furthermore, high temperature steam jets can lead to undesired vaporization of the oil. In addition, although the energy content per pound of steam without liquid water is high, the density of steam is low and its velocity through the chip cleaner is so correspondingly high that there is insufficient time for transfer of the energy from the steam to the chips to condense the steam. Finally, the pressure drop with steam is low and since it is the friction incident to pressure drop which induces cleaning, steam provides a very low frictional cleaning effect.

The disadvantages of dry steam washing of the chips are avoided by employing liquid water as the wash vehicle. A stream of hot water at a superatmospheric pressure in the scrubber substantially or entirely without water vapor is within the context of this invention. However, such a stream requires a high linear velocity to provide the required pressure drop scrubbing effect.

An embodiment of the present invention is capable of greatly enhancing the scrubbing effect of liquid water by imparting to the water nearly the high velocity of a jet of steam without expending the high energy costs incident to producing steam in boiler tubes. The present invention is also capable of accomplishing a given cleaning effect with a lower mass flow than if steam were used, i.e. with a higher efficiency. The invention requires only a hot water heater to produce a stream of hot water under pressure and this stream of hot water is supplied continuously to a pressurized vessel or container holding a packed bed of oily chips. The feed water can be saturated or subcooled. The pressure in the hot water feed conduit is sufficiently high to prevent vaporization of a significant amount of water in advance of the pressurized cleaner vessel and preferably is sufficiently high to prevent any liquid vaporization in advance of the pressurized chip container.

Since the effective diameter of the pressurized cleaner vessel is considerably larger than the total effective diameter of the hot water feed conduit or conduits, in the vaporization embodiment of this invention the hot water will expand upon passage from the feed conduit to the pressurized container. This expansion will induce a pressure drop in the flowing stream. In addition, flow of the stream through a tightly packed bed of chips will induce a further pressure drop. In accordance with the vaporization embodiment of the invention, the temperature and pressure conditions of the feed liquid water stream in the inlet conduit are established in relation to these two pressure drop effects so that the loss of pressure in the flowing stream within the pressurized cleaner will induce a definite, but limited, degree of vaporization of the feed liquid.

It is shown below that under proper thermodynamic conditions a controlled release of pressure on the hot water stream in the chip scrubber container to accomplish a controlled and relatively small degree of vaporization can induce a disproportionately large reduction in density in the flowing aqueous stream. The density referred to is not the density of liquid or gaseous phases individually, but the density of a stream turbulently expanding as it flows to form a dispersion of both the gaseous and liquid phases, wherein the liquid phase is probably in globular form in a mix with vapor. For example, reducing the pressure of saturated water at 110 psia to 30 psia results in the vaporization of 9.2 weight percent of the hot water resulting in a density change from 56.1 lb/ft$^3$ to 0.78 lb/ft$^3$. For purposes of comparison, 100 percent water vapor at 1 atmosphere has a density of 0.04 lb/ft$^3$. Thereby, the present invention is capable of obtaining the superior scrubbing effect of liquid water while obtaining nearly the high velocity of jets of dry steam.

It is apparent that percentagewise nearly the full reduction in density that would be achieved by 100 percent vaporization of the water can be achieved by only about 10 weight percent vaporization, or less. One advantage of only 10 percent vaporization versus 100 percent vaporization is that the temperature loss due to vaporization is inhibited. Excessive cooling is disadvantageous because a high stream temperature reduces the viscosity of the oil to assist oil removal. It also leaves the chips at a relatively high temperature at the end of a cycle enabling the chips to dry rapidly. Loss of water, as well as loss of oil, is important for chip reclaiming in metallurgical reclaiming processes. Another advantage of only about 10 percent vaporization versus 100 percent vaporization is that most of the feed water will remain in the liquid state to allow formation of an oil-in-water mixture as a vehicle for the removal of the oil washed from the chips.

In accordance with the vaporization embodiment of this invention, not more than 50 weight percent, generally; not more than 20 or 30 weight percent, preferably; or not more than 10 or 15 weight percent, most preferably; of the liquid feed water is converted to water vapor in the pressurized chip scrubber container. It is the advantage of this invention that the density of the partially vaporized aqueous stream will be less than 50 percent, generally; less than 20 or 30 percent, preferably; or less than 10 or 5 percent, most preferably; based on the density of the liquid feed water. Typically, said vaporization causes a density decrease in the aqueous stream from a level above 50 lbs/ft$^3$ to a level below 20 or 10 lbs/ft$^3$.

As stated above, the frictional effect of fluid flow over the oily chips tends to induce the desired cleaning effect. Furthermore, it is well-known that a frictional effect induces pressure drop in a flowing stream. According to the Cozeny Carmen Equation for pressure drop of a flowing fluid through a packed bed, the pressure drop ($\Delta P$) in pounds per square inch is proportional to the density ($\rho$) of the fluid (lb/ft$^3$) times the square of the superficial velocity (v) in feet per minute (ft/min.). Assuming a superficial velocity of 1 ft/min of a stream of pressurized hot water having a density of 56 lb/ft$^3$, then $$\Delta P \sim \rho \cdot V^2$$

$$\Delta P \sim 56 \times 1^2 \quad (1)$$

Assume about 8 percent vaporization of the water in the chip scrubber so that the density of the flowing stream is reduced from approximately 56 lb/ft$^3$ to approximately 1 lb/ft$^3$. At a constant mass flow, the density value and the velocity value in the above proportionality become interchangeable. The reason is that mass flow equals density ($\rho$) times the superficial velocity (v) times the cross sectional area (A) of the flow path, expressed as follows:

$$\text{Mass rate} = (\rho) \times (v) \times (A)$$

or $$\text{lb/min} = (\text{lb/ft}^3) \times (\text{ft/min}) \times (\text{ft}^2)$$

Where mass flow and cross sectional areas are constants, the values of $\rho$ and v must be interchangeable, so that the pressure drop proportionality upon about 8 percent vaporization becomes $$\Delta P \sim 1 \times (56)^2 \quad (2)$$

Comparing equation (1) with equation (2), $\Delta P$ is changed from $(56) \times (1)^2$ to $(1) \times (56)^2$, so that vaporization of a portion of the flowing liquid stream in the chip container provides an exponential advantage to the frictional cleaning function. In the instant example, the increase in the frictional cleaning function is 56-fold.

It is important to the vaporization embodiment of this invention that the vaporization of the liquid water occurs within the vessel containing the bed of oily chips, preferably within the bed itself, rather than before or after the vessel containing the bed. In this manner, the frictional forces generated by the turbulent expansion are harnessed to do the useful work of frictionally cleaning the chips. Thereby, the entropy increase due to the expansion within the cleaning vessel is harnessed to do useful work.

Because the expansion and vaporization occur directly at or within the packed bed of chips, the crevices or intersticial spaces between chips in the packed bed become expansion orifices. The abrasive and cleansing effects due to fluid expansion at an orifice are commonly observable. The highly polished appearance maintained at the expansion edge of a circular measuring orifice is visual evidence of the cleansing effect of an expanding stream. Other evidence of the frictional effect of a high velocity flowing fluid is the metal erosion that can be observed on the inner wall of a conduit containing a high velocity fluid. It is the purpose of the present invention to harness these abrasive and entropy increase effects to accomplish the work of cleaning oil from chips. The frictional expansion process can be performed adiabatically. In this manner, the mass of water required for cleaning and the heating requirements of the system can be reduced.

EXAMPLE 1

A cleaning test was performed by filling a glass tube 36 inches long and one-half inch inside diameter with oily iron chips. The outlet end of the tube was packed with about a one-inch layer of steel wool. Feed water at a pressure of 100 psig and a temperature of 332° F. was charged continuously to the top of the enclosed glass tube. The feed water was subcooled. It would have been saturated at a temperature of 350° F.

It was observed through the glass that the water was in the liquid state along the inlet 30¾ inches of the tube. However, the water was observed to be at least partially vaporized in the outlet 5¼ inches of the tube.

At the end of the test, examination of the chips located at the inlet 30¾ inches of the tube showed that they were tolerably clean. However, the chips disposed at the outlet 5¼ inches of the tube were so thoroughly clean that they quickly assumed a brown discoloration, which indicated rusting due to the lack of protection of an oil film. No rusting was observed in the chips from the inlet 30¾ inches of the tube.

EXAMPLE 2

A cleaning test was performed by filling with oily iron chips a glass tube 17 inches long and one-half inch inside diameter whose outlet was packed with about a one-half inch layer of steel wool. Water available at a pressure of 100 psig and a temperature of 332° F. was passed through a throttling valve and then charged to the inlet of the glass tube.

The throttling valve was partially closed so that vaporization was observed through the entire length of the enclosed glass tube. It was observed during the run that brown discolorization of the metal chips occurred along the entire length of the glass tube, indicating rusting. The deepest brown discoloration occurred at the outlet of the bed and the brown discoloration was lightest at the inlet of the bed.

The deepest brown discoloration indicates the greatest degree of rusting which, in turn, indicates the greatest degree of oil removal. Therefore, the test indicates that the greatest extent of oil removal occurred in the chips at the outlet of the bed with a progressively lower degree of oil removal occurring at positions progressively closer to the inlet of the bed.

In order to obtain uniform and maximized oil removal in the chips being cleaned, an apparatus can be devised wherein the chips flow continuously through the chip cleaner vessel under superatmospheric pressure in either a cocurrent or countercurrent direction with respect to the aqueous stream.

The present invention will be further understood by reference to the accompanying drawings in which:

FIG. 1 presents a graph of a constant enthalpy expansion of a saturated water system showing density starting at a pressure of 110 psia and a temperature of 335° F. and expanding to 30 psia (9.2 weight percent vapor). For purposes of illustration, FIG. 1 also shows that the density of 100 percent vapor at 1 atmosphere pressure is 0.04 lb/ft³.

Figure 2:
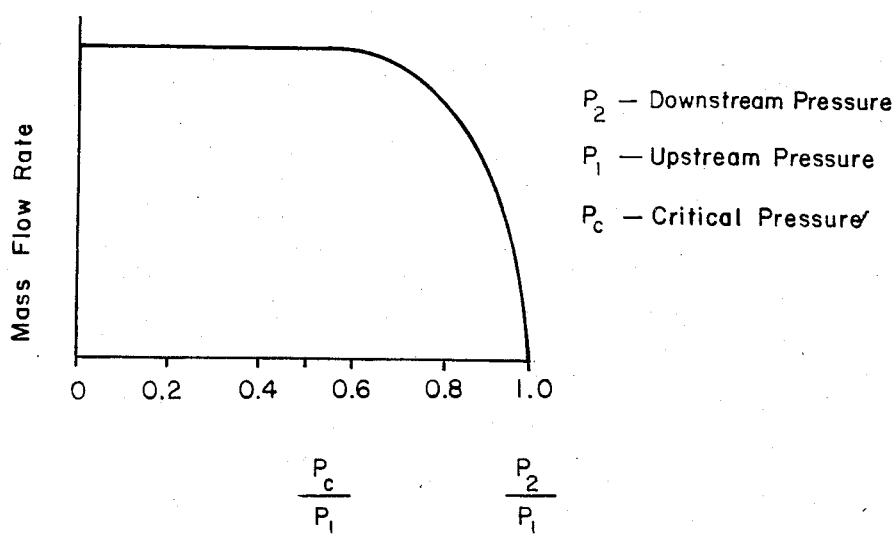

FIG. 2 presents a diagram showing for a steam flow system the minimum pressure ratios required across a nozzle or any restriction, such as the bed of chips plus the perforated plate at the bottom of the chip scrubbing chamber, to maintain a maximum mass flow rate. The diagram of FIG. 2 was taken from an article entitled "Analyzing Flashing Flow with a Programmable Calculator", E. M. Amorante, Plant Engineering, Apr. 19, 1979, pages 269 to 273, which is hereby incorporated by reference.

Figure 3:
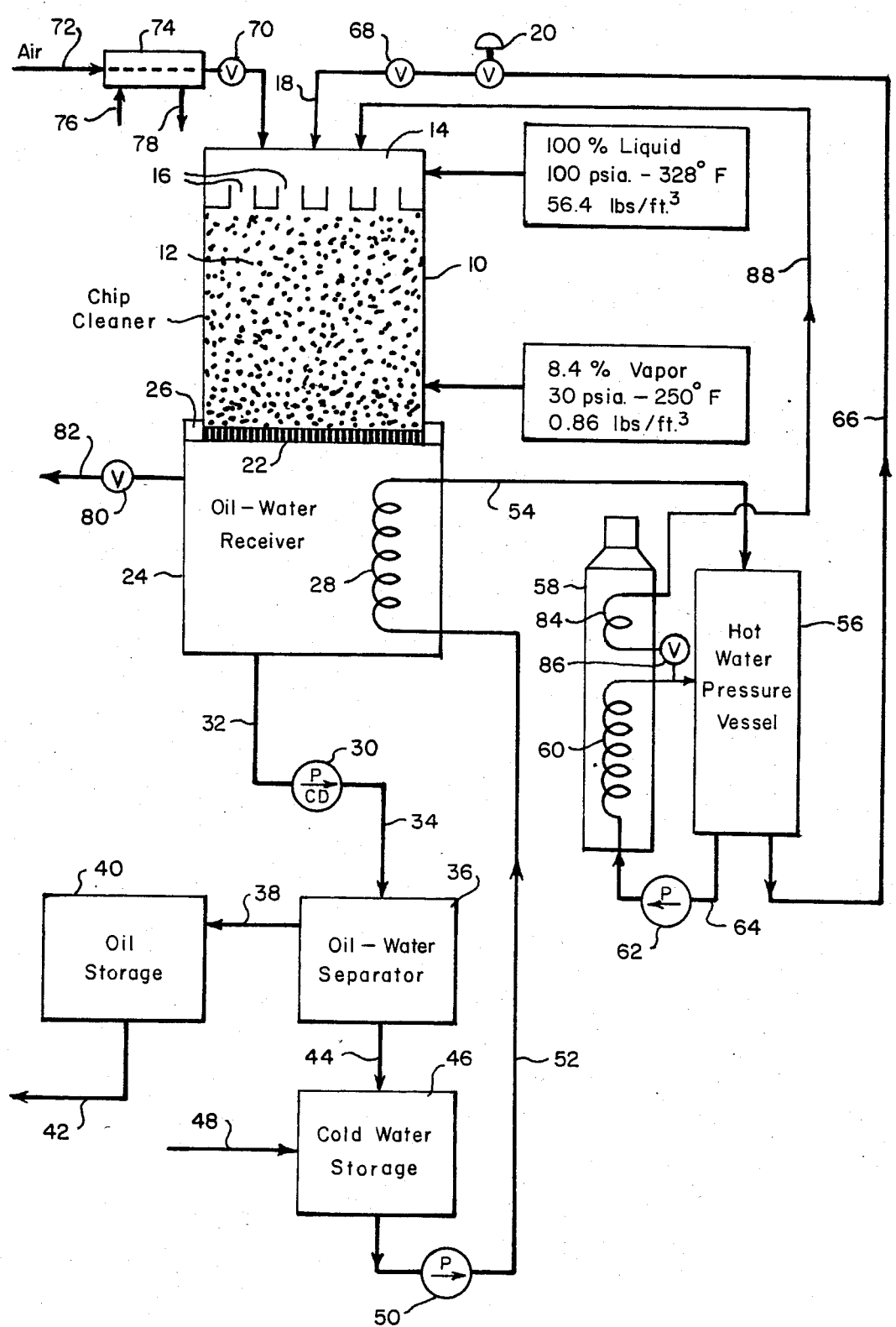

FIG. 3 is a diagram of a process flow scheme employing the water vaporization embodiment of the present invention.

FIG. 1 shows that the density of water without vapor at a pressure of 110 psia and a temperature of 335° F. is 56.1 lb/ft³. When the system comprises only 9.2 percent vapor and 90.8 percent liquid (30 psia), the density is only 0.78 lb/ft³. For purposes of comparison, 100 percent water vapor at 1 atmosphere has a density of 0.04 lb/ft³. It is seen that nearly 100 percent of the entire density reduction in flashing from 100 percent liquid water to 100 percent vapor is achieved by flashing from 100 percent liquid water to only 9.2 percent vapor.

FIG. 2 presents a graph for a steam flow system of mass flow rate through nozzle openings at various downstream to upstream pressure ratios. The interstices between chips in the bed and the perforations in the chip retainer plate at the bottom of the chip scrubber can be considered as nozzle openings. However, the chip interstices present a restriction whose friction comprises the cleaning forces. On the other hand, the perforations on the retainer plate can induce an unnecessary flow restriction. FIG. 2 shows that the flow rate across the chip bed from the inlet water port to the inlet of the perforations will be zero when the ratio of pressure immediately below the chip bed ($P_2$) to pressure above the bed ($P_1$) is 1. The flow rate will increase as this ratio declines until a ratio of 0.545 is reached, at which maximum flow occurs. Maximum flow will be maintained as the ratio $P_2/P_1$ declines further. Therefore, a critical pressure $P_c$ for steam is defined as $$P_c = 0.545\, P_1$$

where the pressures are expressed in psia.

FIG. 2 similarly shows that if the ratio of the pressure immediately outside the perforated discharge plate of the scrubber to the pressure immediately inside the perforated plate of the scrubber is considerably more than 0.545 the plate will exert an unnecessary and undesired flow restriction, tending to inhibit the high flow velocity scrubbing effect of the present invention. FIG. 2 shows that good results are achieved if the ratio of the pressure outside to the pressure inside the bottom perforated plate is no more than 0.6 or 0.7.

Based upon the curve in FIG. 2, if the bottom perforated plate of the scrubber opens to atmospheric pressure, the pressure immediately above the perforated plate should be not greater than 1/0.545 atmospheres (1.83 atmospheres), most preferably or not greater than 1/0.6 atmospheres (1.67 atmospheres), preferably; or not greater than 1/0.7 atmospheres (1.43 atmospheres), generally; in order to maintain maximum flow through the system.

If the pressure drop within the scrubber is not sufficiently great whereby these pressures are exceeded above the perforated plate, the plate will unnecessary inhibit the overall superficial velocity through the scrubber. In such case there are two alternatives. In the first, more chips can be added to increase the pressure drop within the scrubber. In the second, a positive displacement pump can be installed to draw a partial vacuum at the discharge of the perforated plate to increase the flow rate.

Referring to FIG. 3, vessel 10 is the pressurized chip cleaner or containment vessel and contains a bed of oily chips 12. After chip container vessel 10 is filled with a load of chips by any convenient means, not shown, pressurized hot water at a temperature of at least 250° F., or at least 300° F., preferably, or at least 325° F., most preferably, is pumped to overhead feed water zone 14 in vessel 10 having one or more water feed conduits 16. The water is supplied to zone 14 through conduit 18 wherein the pressure is controlled by valve 20 which is actuated by control means, not shown.

The water in zone 14 can be typically under a pressure of 100 psia and a temperature of 328° F., under which conditions it will be substantially entirely a liquid having a density of about 56.4 lb/ft³. When the water begins to flow over the chips at start of run conditions, the container 10 and the bed of chips 12 will be near room temperature and will remove heat from the flowing stream until temperature equilibrium is reached between the chips and the hot flowing stream. At start of run conditions there may be insufficient heat available to heat both the chips and the container and also vaporize some of the water. Therefore, the present system probably will not achieve the scrubbing advantage of a flashing nozzle at the outset of a run. The use of water as a heating vehicle at start of run may not be desired since it can exert a load on the water purifying and recycle system described below, without providing a vaporizing function. Therefore, at start of run it may be more advantageous to blow hot air over the chips until a predetermined preheat temperature is reached, and only convert to hot water at the time the chips are sufficiently hot to induce vaporization at constant enthalpy conditions.

If the system is started up with hot air, water valve 68 is closed and compressed air valve 70 is opened. The compressed air flows through line 72 and heat exchanger 74. A heating fluid, such as hot water, enters the jacket of heat exchanger 74 through inlet line 76 and leaves through discharge line 78. The hot compressed air then passes through zone 14 and conduits 16 to the bed of chips 12. The hot air can be exhausted from the system by opening valve 80 in line 82.

If desired, the system can be preheated with saturated or superheated steam. In this case, steam can be prepared by providing an additional heating coil 84 in furnace 58 to vaporize the hot water exiting from coil 60, derived from a source described below. The steam is prepared by opening valve 86. The steam flows through line 88 to the top of chip cleaner 10 and flows until a predetermined amount necessary to preheat the system to process temperature is introduced. During any preheating step, pump 30 is shut off. The superheated steam will condense in the preheating step creating a vacuum in the system. Sensing the vacuum, the valve 20 automatically opens and the cleaning cycle can be started automatically and valve 86 closed.

When the chips are sufficiently preheated to induce water vaporization, air valves 70 and 80 and steam valve 86 must all be closed and water valve 68 is opened. Also, pump 30 is started. The feed water then flows through conduits 16 to the interior of container 12 and expands into a mixture of steam and water globules, causing a pressure drop. The liquid-vapor mixture flows downwardly through the bed of chips, causing a further pressure drop. Typically, at the bottom of the bed the conditions of the flowing stream will include a pressure of 30 psia, a temperature of 250° F., a vapor content of 8.4 weight percent of the aqueous stream and a density of about 0.86 lb/ft$^3$. Since 100 percent vaporization will correspond to a stream density of about 0.4 lb/ft$^3$, it is apparent that 8.4 percent vaporization accomplishes nearly 100 percent of the density reduction possible upon full vaporization.

The friction of linear flow and flash expansion of the water into the interstices between the oil chips in chip cleaner vessel 10 tends to scrub the oil from the metal chips to form a stream comprising an oil-water admixture in equilibrium with water vapor. The stream flows through the perforations in perforated plate 22 disposed at the bottom or discharge end of vessel 10 and is received into oil-water receiver vessel 24. Vessel 24 is sealed from the atmosphere by a suitable gasket 26. Condenser coil 28 allows coolant liquid, from a source described below, to condense the vapor entering receiver 24.

As explained above, to maintain maximum flow when the pressure in vessel 24 is atmospheric the pressure above perforated plate 22 should be not greater than about 1.83 atmospheres. If the pressure drop across the bed of chips is so low that the pressure at the bottom of the bed of chips is greater than about 1.83 atmospheres, a partial vacuum can be induced in oil-water receiver 24 to accomplish the required pressure drop.

Positive displacement pump means 30 can be provided in discharge line 32 to draw any required partial vacuum in oil-water receiver vessel 24. Inducing a subatmospheric pressure within receiver vessel 24 can provide the advantage of increasing velocity, acceleration and friction of the flowing liquid and vapor stream over the oil chips in bed 12 to enhance the scrubbing effect thereon. If maximum flow is being maintained without drawing a vacuum, pump means 30 can be operated to remove liquid from vessel 24 without drawing a vacuum.

Pump 30 discharges a liquid stream comprising an oil-water mixture through line 34 to oil-water separator vessel 36 where oil and water are allowed sufficient time to separate into layers. The overhead oil layer is drawn off through line 38 and passed to oil storage vessel 40 from which it can be drawn off through line 42 for sale or for use as process fuel in furnace 58, as desired.

The lower or water layer is removed from oil-water separator 36 through line 44 and passed to cold water storage vessel 46. Cold make-up water can be added to vessel 46 through line 48. Cold water is removed from cold water vessel 46 through pump 50 and line 52 and then passed through condenser 28 in oil-water receiver vessel 24 where it acquires some heat by condensing vapor and cooling liquid in receiver 24. It is then passed through line 54 to hot water pressure vessel 56. The water in vessel 56 is heated by circulation through furnace 58, which is fired by conventional means, not shown. The water is circulated through coil 60 in fired heater 58 by means of circulating pump 62 and line 64 to provide heat and pressure to the water in vessel 56.

The hot water in vessel 56 is then recirculated through line 66, pressure control valve 20, valve 68 and line 18 to inlet water zone 14 for reuse.

After the chips have been scrubbed free of their oil content, water inlet valve 68 is closed and a water-oil mixture is allowed to drain out of chip cleaner 10. The chips are then in a hot condition. Although not necessarily required, if additional drying is desired, compressed air valve 70 and air discharge valve 80 are opened. The compressed air can be heated or unheated. Air then flows through line 72 to chip cleaner vessel 10 containing hot chips to accomplish rapid drying of the chips. The air is exhausted from the system through valve 80 and line 82.

The dry chips are then removed from vessel 10 by any suitable means, not shown. The removed metal chips can be transported to a suitable facility for melting and reclaiming.

Whereas particular embodiments of the invention have been described above for purposes of illustration, it will be apparent to those skilled in the art that numerous variations of the details may be made without departing from the invention as defined in the appended claims.

I claim:

1. A process for removing oil from metal chips with an aqueous stream comprising disposing a bed of metal chips coated with oil within a pressure vessel provided with inlet conduit means and discharge opening means, passing through said inlet conduit means a continuous stream of liquid feed water at a superatmospheric pressure sufficiently high to maintain the water in said inlet conduit means substantially in the liquid phase, passing said stream of water into said vessel and through said bed of metal chips, the temperature and velocity of the water being sufficiently high to remove oil from the chips without substantial vaporization of said oil or said liquid water, maintaining a superatmospheric pressure within said vessel, said oil being removed from said chips and forming an oil-water mixture, and continously removing said oil-water mixture from said vessel through said discharge opening means.

2. The process of claim 1 wherein the water in said inlet conduit means and said pressure vessel is substantially entirely in the liquid phase.

3. A process for removing oil from metal chips with an aqueous stream comprising disposing a bed of metal chips coated with oil within a pressure vessel provided with liquid water inlet conduit means and aqueous liquid-vapor discharge opening means, passing through said inlet conduit means a continuous stream of liquid feed water at a pressure sufficiently high to maintain the water in said inlet conduit means substantially in the liquid phase, passing said stream of water into said vessel and through said bed of metal chips, the temperature of the water being sufficiently high to remove oil from said chips without substantial vaporization of said oil, an amount up to 50 weight percent of the liquid water in said inlet conduit means being vaporized during passage from said inlet conduit means and through said bed of chips, said vaporization causing the density of the aqueous stream at said bed of metal chips to be less than 50 percent of the density of the liquid water in said inlet conduit means, said oil being removed from said chips and forming an oil-water mixture, and removing water vapor and said oil-water mixture from said vessel through said discharge opening means.

4. The process of claim 3 wherein a superatmospheric pressure is maintained throughout said vessel.

5. The process of claim 3 wherein the stream of water in said inlet conduit means is substantially entirely in the liquid phase.

6. The process of claim 3 wherein said vaporization causes the density of said aqueous stream to decrease from a level above 50 lbs/ft$^3$ to a level below 20 lbs/ft$^3$.

7. The process of claim 3 wherein said vaporization causes the density of said aqueous stream to decrease from a level above 50 lbs/ft$^3$ to a level below 10 lbs/ft$^3$.

8. The process of claim 3 wherein the ratio of the pressure outside said discharge opening means to the pressure inside said discharge opening means is no more than 0.7.

9. The process of claim 3 wherein the ratio of the pressure outside said discharge opening means to the pressure inside said discharge opening means is no more than 0.6.

10. The process of claim 3 which is essentially adiabatic.

11. The process of claim 3 including vacuum inducing means to lower the pressure outside said discharge opening means.

12. The process of claim 3 including a chip preheating step wherein the chips are preheated prior to said process.

13. The process of claim 12 wherein the chips are preheated with hot water.

14. The process of claim 12 wherein the chips are preheated with heated air.

15. The process of claim 12 wherein the chips are preheated with steam.

16. The process of claim 3 including a chip drying step at the end of said process.

17. The process of claim 16 wherein the chips are dried with a stream of air.

18. The process of claim 3 wherein the water in said inlet conduit means is at a temperature of at least 250° F.

19. The process of claim 3 wherein the water in said inlet conduit means is at a temperature of at least 300° F.

20. The process of claim 3 wherein the water in said inlet conduit means is at a temperature of at least 325° F.

21. The process of claim 3 wherein less than 10 weight percent of the water in said inlet conduit means vaporizes during said vaporization.

22. The process of claim 3 wherein less than 15 weight percent of the water in said inlet conduit means vaporizes during said vaporization.

23. The process of claim 3 wherein less than 20 weight percent of water in said inlet conduit means vaporizes during said vaporization.

24. The process of claim 3 wherein the density of the aqueous stream at said bed of metal chips is less than 10 percent of the density of the liquid water in said inlet conduit means.

25. The process of claim 3 wherein the density of the aqueous stream at said bed of metal chips is less than 5 percent of the density of the liquid water in said inlet conduit means.

26. The process of claim 3 wherein the pressure outside said discharge opening means is atmospheric and the pressure immediately inside said discharge opening means is not greater than 1.83 atmospheres.

27. The process of claim 3 wherein said water vapor and said oil-water mixture removed from said vessel are passed to an oil-water receiver, condensing said water vapor in said receiver and pumping an oil-water mixture from said receiver.

28. The process of claim 27 wherein the pumped oil-water mixture is pumped by means of a constant displacement pump to draw a vacuum in said receiver.

29. The process of claim 27 wherein said pumped oil-water mixture is pumped to an oil-water separator, and removing separate oil and water streams from said separator.

30. The process of claim 29 wherein said separate water stream is passed through coil means in said receiver to remove heat and condense water vapor therein.

31. The process of claim 29 wherein said separate water stream is passed to a hot water heater where it is reheated and then recycled to said pressure vessel containing metal chips.

32. The process of claim 3 wherein said vaporization is performed at substantially constant enthalpy.

33. The process of claim 3 wherein said liquid feed water is saturated.

34. The process of claim 3 wherein said liquid feed water is subcooled.

35. The process of claim 3 wherein the chips in said bed move continuously through said vessel.

36. The process of claim 35 wherein said chips move cocurrently with respect to said aqueous stream.

37. The process of claim 35 wherein said chips move countercurrently with respect to said aqueous stream.

* * * * *